United States Patent [19]

Rose et al.

[11] Patent Number: 5,718,447
[45] Date of Patent: Feb. 17, 1998

[54] PRESSURE RELIEF IN AIRBAG MODULE REACTION CANISTERS

[75] Inventors: Larry D. Rose, Layton, Utah; Brent R. Marchant, Knoxville, Tenn.

[73] Assignee: Morton International, Inc., Chicago, Ill.

[21] Appl. No.: 711,639

[22] Filed: Sep. 10, 1996

[51] Int. Cl.$^6$ ................................................. B60R 21/16
[52] U.S. Cl. ........................ 280/728.2; 280/739; 280/742
[58] Field of Search .......................... 280/728.2, 739, 280/740, 741, 742

[56] References Cited

U.S. PATENT DOCUMENTS

| | | | |
|---|---|---|---|
| 2,250,787 | 7/1941 | Anderson | 85/32 |
| 2,251,345 | 8/1941 | Triplett | 99/192 |
| 2,803,318 | 8/1957 | Nickerson | 189/45 |
| 4,941,678 | 7/1990 | Lauritzen et al. | 280/732 |
| 4,964,652 | 10/1990 | Karlow | 280/731 |
| 5,036,658 | 8/1991 | Tate | 60/253 |
| 5,044,154 | 9/1991 | English, Jr. et al. | 60/223 |
| 5,320,127 | 6/1994 | Yanagihara et al. | 137/72 |
| 5,332,256 | 7/1994 | Lauritzen et al. | 280/728 |
| 5,407,223 | 4/1995 | Lauritzen et al. | 280/728 |
| 5,407,226 | 4/1995 | Lauritzen et al. | 280/728.1 |
| 5,407,227 | 4/1995 | Lauritzen et al. | 280/728.1 |
| 5,431,436 | 7/1995 | Mossi et al. | 280/728.1 |
| 5,454,586 | 10/1995 | Rogerson | 280/728.2 |
| 5,480,182 | 1/1996 | Lauritzen et al. | 280/728.2 |
| 5,498,024 | 3/1996 | Caruso, Jr. et al. | 280/728.2 |
| 5,505,484 | 4/1996 | Miles et al. | 280/728.2 |

*Primary Examiner*—Kenneth R. Rice
*Attorney, Agent, or Firm*—Nick C. Kottis; Gerald K. White

[57] ABSTRACT

Featured for use as a part of an inflator-containing inflatable restraint system is a multipiece reaction canister wherein pieces of the canister are normally secured together by thermally degradable joining members which degrade at a temperature greater than the ambient temperature to which the reaction canister is normally subjected and less than the temperature at which the inflator autoignites, to permit separation of the reaction canister pieces and provide venting of pressure that can build-up within the reaction canister. As a result of alleviating concerns such as of material fragmentation when exposed to extreme heat conditions, e.g., a fire, the invention allows the more widespread use of light weight, temperature sensitive materials in reaction canister constructions.

21 Claims, 4 Drawing Sheets

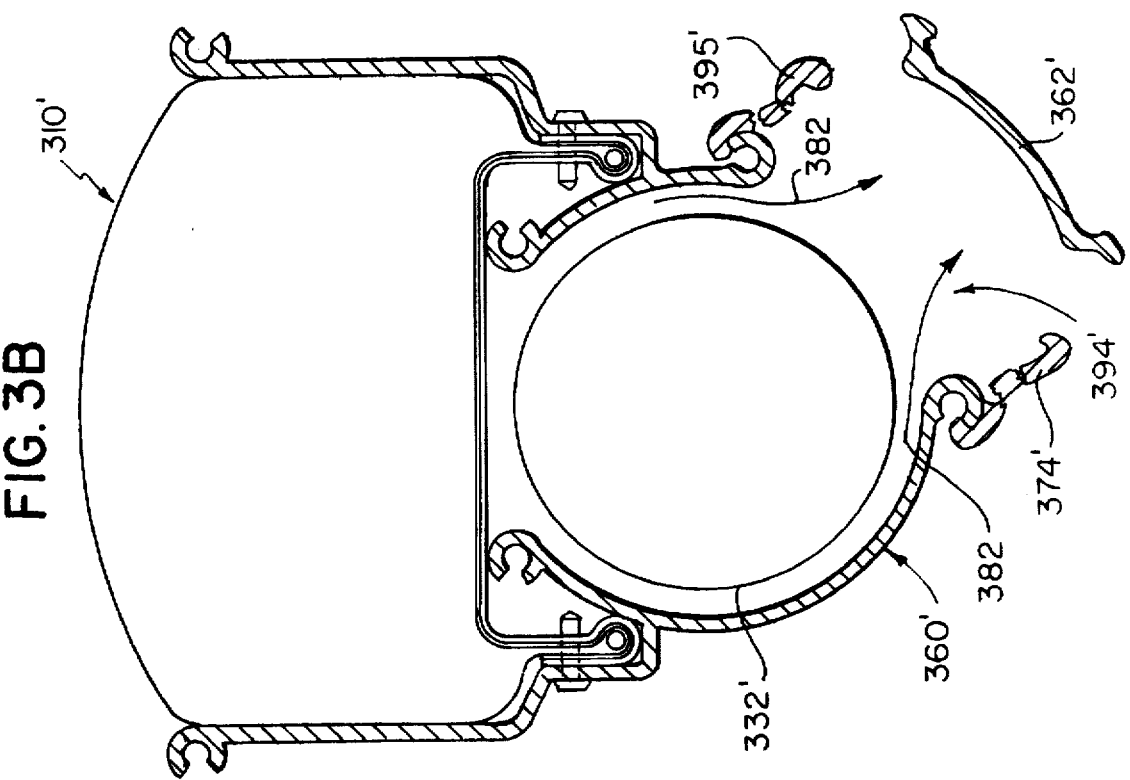
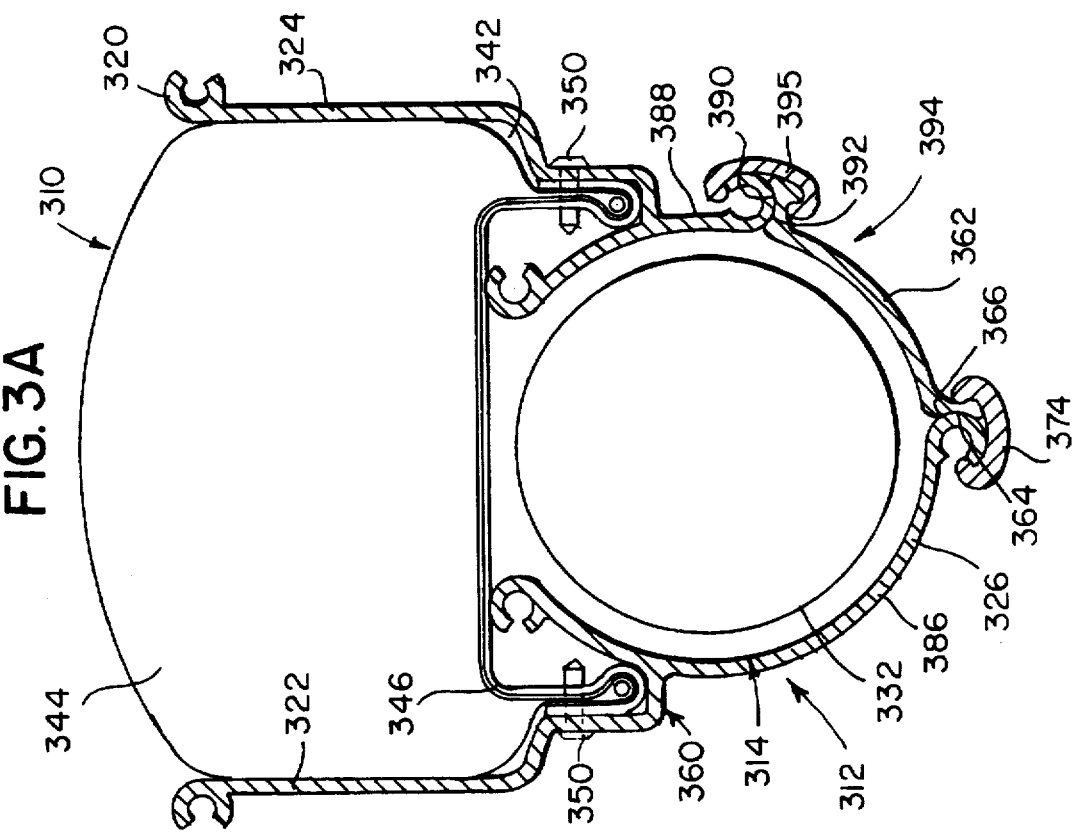

PRESSURE RELIEF IN AIRBAG MODULE REACTION CANISTERS

BACKGROUND OF THE INVENTION

This invention relates generally to inflatable passive restraint systems and, more particularly, to an airbag module reaction canister structure such as used in such systems to house and position system components such as an airbag inflator and an inflatable airbag, for example, within the vehicle.

Airbag module assemblies generally include three basic components: 1 a cushion or airbag that is inflated with gas such as when the vehicle encounters a sudden deceleration, 2) an inflator which upon actuation serves to provide the gas used to inflate the airbag, and 3) a reaction canister which typically functions as a structural housing supporting assembly components such as the inflator and the airbag, for example, while providing a mounting base for installation of the assembly in a vehicle and direction to the inflation gases resulting from the inflator.

Emphasis on weight reduction in automobiles has created a need, and a demand, for lighter weight inflatable passive restraint systems. A significant reduction in the weight of such systems can be achieved through the utilization of lower weight materials such as aluminum or aluminum alloy, rather than comparatively heavy steel material, as used previously, for inflatable restraint system inflator reaction canister structures.

Such airbag module assemblies and components therefor are described in various prior patents, including commonly assigned U.S. Pat. No. 4,941,678; 5,332,256; 5,407,223; 5,407,226; 5,407,227; 5,431,436 and 5,480,182, for example.

FIG. 1 illustrates a typical such airbag module assembly, generally designated by the reference numeral 10. The airbag module assembly 10 includes a reaction canister 12 formed of a reaction canister body 14, such as specifically described in the above-identified, commonly assigned U.S. Pat. No. 5,407,226, issued Apr. 18, 1995, the disclosure of which is fully incorporated herein by reference. As described therein, the reaction canister body 14 is formed as a one piece construction by means of extrusion of a light weight material such as a relatively light weight metal such as aluminum or magnesium, for example.

The reaction canister body 14 includes the general form of a long, narrow, open receptacle or trough. In the reaction canister 12, end plates 16a and 16b are secured to opposite ends of the reaction canister body 14 such as by means of fasteners 18 (only one of which is shown) which are passed through corresponding fastener holes 19 in the end plates 16a and 16b and into corresponding attachment preparations 20 in the reaction canister body 14.

The reaction canister body 14 also includes first and second opposite side walls or panels, 22 and 24, respectively, joined together by means of a bridging portion 25 having the form of an integrally shaped inflator holder 26 formed by a wall 30. Such an inflator holder 26 is generally sized, shaped, and adapted for the placement therein of an inflatable restraint system inflator 32, such as having an elongated tubular chamber portion 34 with opposite ends 36a and 36b and from which gas is discharge from one of such ends, in the illustrated assembly 10, from the end 36a.

In practice, such inflator holders generally have a circular cross section extending less than 360°. As described in U.S. Pat. No. 5,407,226, as a result of practical limitations in extrusion fabrication such as those involving die tongue ratio and operational limitations such as the reaction canister body having an opening sized to permit proper gas flow therethrough while permitting proper spacing and locating of attachment preparations as well as having an inflator holder functioning as a retaining device for an inflator, such an extruded reaction canister body having an inflator holder of partial circular cross section will generally include a gap opening 38 of an arc angle of at least about 45°, preferably at least about 90°, and typically no more than about 180°, preferably no more than about 135°.

The inflator 32 is further secured within the reaction canister 12, and specifically the inflator holder 26, by means of end bases 40a and 40b at each of the ends 36a and 36b, respectively.

The reaction canister body side walls 22 and 24 are generally spaced apart and in conjunction with the inflator 32 and the first and second end plates 16a and 16b define an air bag retaining cavity, generally designated by the reference numeral 42, wherein an airbag 44, such as folded in a conventional manner, can be housed.

Such a reaction canister structure provides protection for the inflator 32 and the airbag 44 until the time of deployment of the airbag and also acts to absorb the loads generated upon such deployment. Typically, these loads are large and unless sufficiently absorbed can cause damage to the vehicle including, in the case of a passenger side assembly, damage to the dash panel.

To assist in producing or forming a more uniform or orderly distribution of gas into the inflating airbag and whereby a more uniformly and/or orderly deployment of the inflating airbag can be effected, the assembly 10 can, if desired, include a diffuser device 46 having a plurality of gas passage openings 48 therein located and sized to provide a desired distribution of gas from the inflator 32 into the airbag 44 at the time of deployment.

The airbag 44 and the diffuser device 46 are typically secured within the assembly 10 by means of fasteners 50 (only one of which is shown) joining the airbag 44 and the diffuser device 46 to the reaction canister 12, specifically the reaction canister body 14.

Airbag assembly structures fabricated of lighter weight materials, such as described above, typically do not experience problems in ordinary use wherein, during the event of a collision, the ignition agent is ignited, followed by the igniting of the gas generant to generate inflation gas. However, the mechanical strength of such lighter weight materials can be significantly lowered when overheated to a high temperature, such as when subjected to a high temperature environment, such as a bonfire. This problem typically stems from the fact that at a temperature in excess of about 300° F. (149° C.), the pyrotechnics of pyrotechnic-containing gas generators commonly automatically ignite. In this temperature range, such housing structures fabricated of aluminum can degrade, resulting in the housing rupturing or bursting, which in turn can result in the projection of pieces and/or fragments of the housing in various directions. Such projecting pieces or fragments can present a hazard to people (including various rescue and emergency personnel) and surroundings in the vicinity of the housing.

Such a problem of housing fragmentation is typically not encountered with structures that employ steel since steel does not degrade until a much higher temperature of about 1100° F. (593° C.) is reached. Thus, the use of aluminum, in place of steel, while beneficially serving to reduce the weight of an assembly can result in a structure having a lower internal pressure capability. This lower internal pressure capability could be hazardous in a high temperature environment such as that which a reaction canister structure in a module assembly might be subjected to in the event of a fire whether in storage, in transit, or after installation in a vehicle.

Thus, there is a need and a demand for inflatable restraint system structures, specifically a reaction canister structure, which provides for the safe release of energy therefrom, such as produced by an inflator housed therein when exposed to extreme heat conditions, e.g., a bonfire, without forming or projecting metal fragments into the occupant compartment of the vehicle interior.

Further, there is a need and a demand for a light weight airbag module assembly structural arrangement which is not subject to undesired fragmentation when subjected to extreme temperature conditions, such as a bonfire.

Still further, there is a need and a demand for an improved reaction canister for use in an airbag module assembly, particularly for the passenger side of a vehicle. In particular, there is a need and a demand for an airbag reaction canister construction and assemblies therewith which facilitate and permit the greater use of light weight, temperature sensitive materials, such as of aluminum and various aluminum alloys, where previously heavier, relatively temperature insensitive materials, such as steel, were used due to concerns such as of material fragmentation when exposed to extreme heat conditions, such as from a fire.

Further, the inclusion in an extruded assembly structure of pressure relieving holes or ports, such as holes or ports normally closed with a fusible material which melts upon exposure to high temperatures, can undesirably complicate manufacture by necessitating post-extrusion machining or punching.

Thus, there is a demand and a need for an appropriate pressure relieving assembly structure which minimizes or, preferably, avoids reliance on post-extrusion machining or punching.

Further, the inclusion in an extruded assembly structure of one or more tear seams which are designed to tear and rupture to provide pressure relief when the pressure thereagainst becomes sufficiently great can undesirably result in unstable structures, e.g., structures which can undergo undesired movement when subjected to normally expected forces and stresses.

Thus, there is a demand and a need for a suitably stable pressure relieving assembly structure.

SUMMARY OF THE INVENTION

A general object of the invention is to provide an improved structure such as can be used to house and position inflatable restraint system components such as an inflator, for example, within a motor vehicle.

A more specific objective of the invention is to overcome one or more of the problems described above.

The general object of the invention can be attained, at least in part, through the securing together of first and second reaction canister body portions by means of at least one thermally degradable joining member. Such a joining member degrades at a temperature greater than the ambient temperature to which the reaction canister is normally subjected and less than the temperature at which the inflator autoignites, to permit separation of the first and second reaction canister body portions.

The prior art fails to allow or permit as great as desired use of light weight, temperature sensitive materials, such as aluminum, magnesium and various alloys thereof where previously heavier, relatively temperature insensitive materials, such as steel, could be used due to concerns such as of material fragmentation when exposed to extreme heat conditions, such as from a fire. In particular, the prior art fails to provide appropriate stable extruded assembly structures and such structures which do not require post-extrusion machining or punching. The invention further comprehends an improved airbag module subassembly which includes an inflatable restraint system reaction canister and an elongated inflator device. The reaction canister includes a trough shaped body section having first and second opposite side walls spaced apart to form an air bag retaining cavity and a bridging portion joining the first and second opposite side walls. The reaction canister forms an inflator holder having a generally circular cross section extending less than 360° adapted to house an inflator chamber tube portion of the inflator.

The trough shaped body section includes first and second conventionally extruded reaction canister body portions held in abutting relationship by means of a thermally degradable joining member. Each of these body portions includes a first mating surface, with the first mating surface of the first reaction canister body portion having a male form and the first mating surface of the second reaction canister body portion having a female form. The first and second reaction canister body portions and, specifically, the first mating surface of each is adapted for mating joinder with the male form first mating surface of the first reaction canister body portion mating and joining with the female form first mating surface of the second reaction canister body portion.

As used herein, references to "extrusion" and "conventional extrusion" are to be understood to delineate from impact processing. Specifically, extrusion generally refers to a fundamental processing operation in many industries in which a material is forced through a metal forming die, followed by cooling or chemical hardening. In contrast, in impact processing, a part is formed in a confining die from a metal slug, usually cold, by a single stroke application of force through a punch causing the metal to flow around the punch.

Other objects and advantages will be apparent to those skilled in the art from the following detailed description taken in conjunction with the appended claims and drawings.

BRIEF DESCRIPTION OF THE DRAWINGS

FIGS. 3A and 3B are simplified cross section views of an airbag module assembly in accordance with an alternative embodiment of the invention before (FIG. 3A) and after (FIG. 3B) degradation of the joining member, with resulting separation of the respective reaction canister body portions.

DETAILED DESCRIPTION OF THE INVENTION

The present invention, as is described in more detail below, provides an improved structure such as can be used to house and position one or more inflatable restraint system components such as an inflator and an airbag, for example, within a motor vehicle.

While the invention is described hereinafter with particular reference to a passenger side air bag module assembly for automotive vehicles including vans, pick-up trucks, and particularly automobiles, it is to be understood that the invention also has applicability not only with other types or kinds of vehicles including, for example, airplanes, but also can, if desired, be used with other types or kinds of air bag module assemblies for automotive vehicles including, for example, driver side assemblies. With respect to automotive vehicles it will also be appreciated that due to usual physical differences between passenger and driver side air bag module assemblies, including the placement and positioning of the module assemblies within a vehicle, the invention is perceived to have particular initial utility in passenger side air bag module assemblies.

Figure 1:
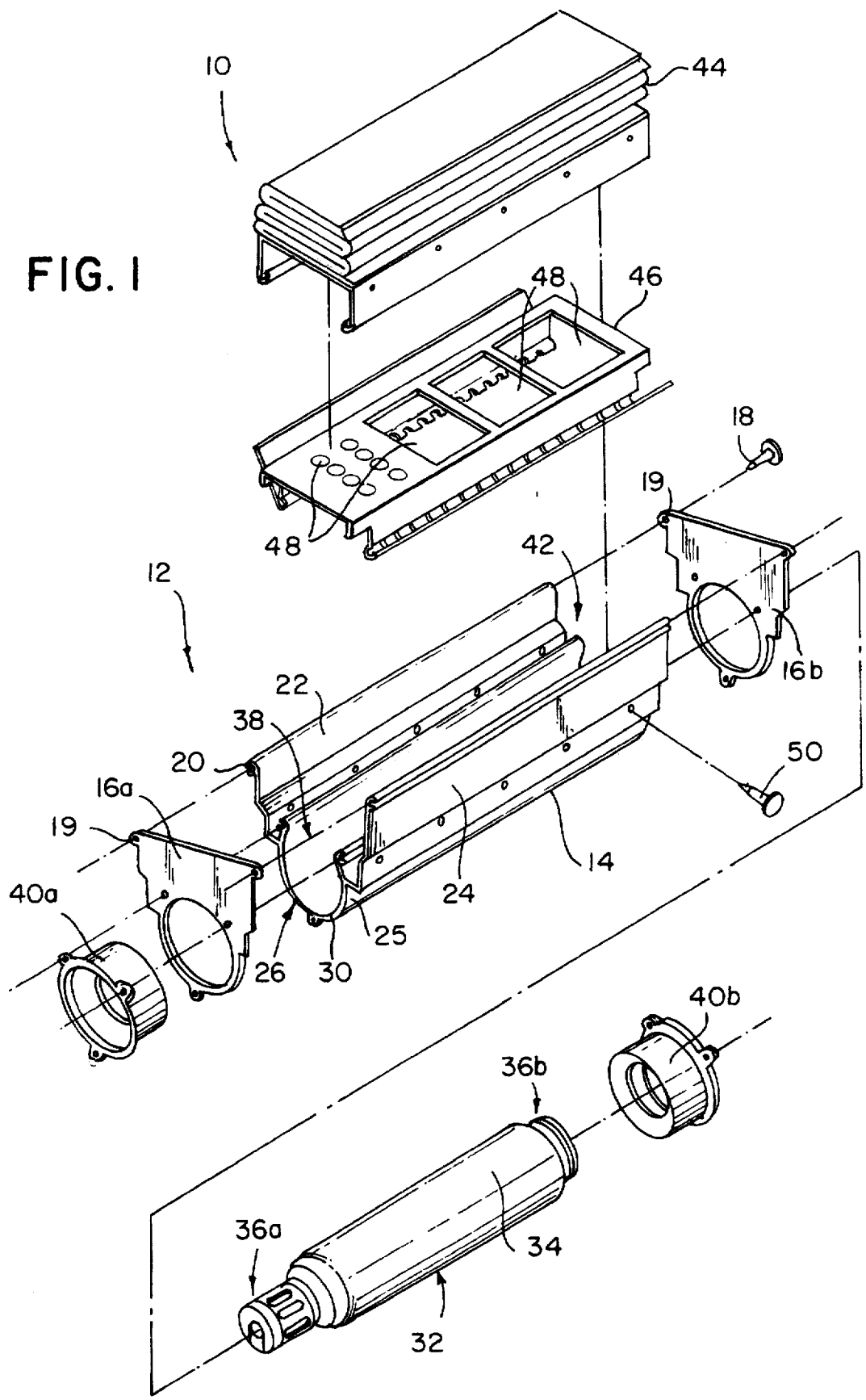
FIG. 1 is a partially exploded simplified perspective view of a prior art airbag module assembly.
Figure 2B:
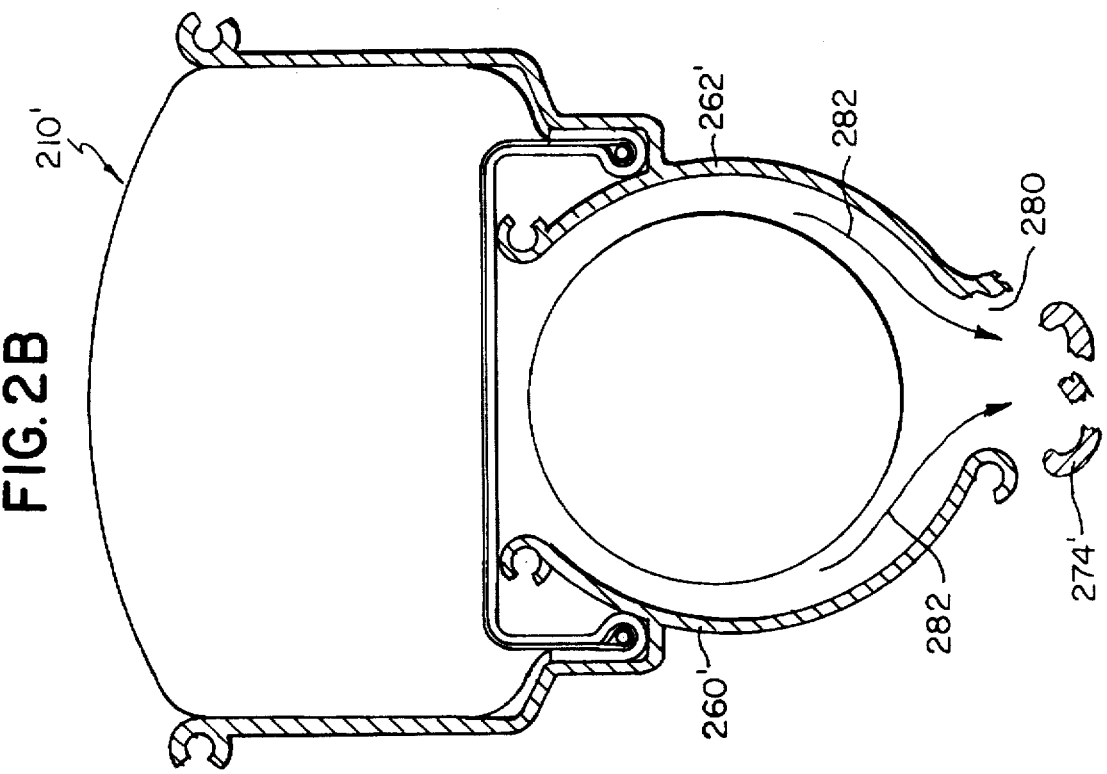
FIGS. 2A and 2B are simplified cross section views of an airbag module assembly in accordance with one embodiment of the invention before (FIG. 2A) and after (FIG. 2B) degradation of the joining member, with resulting separation of the respective reaction canister body portions.
Figure 2A:
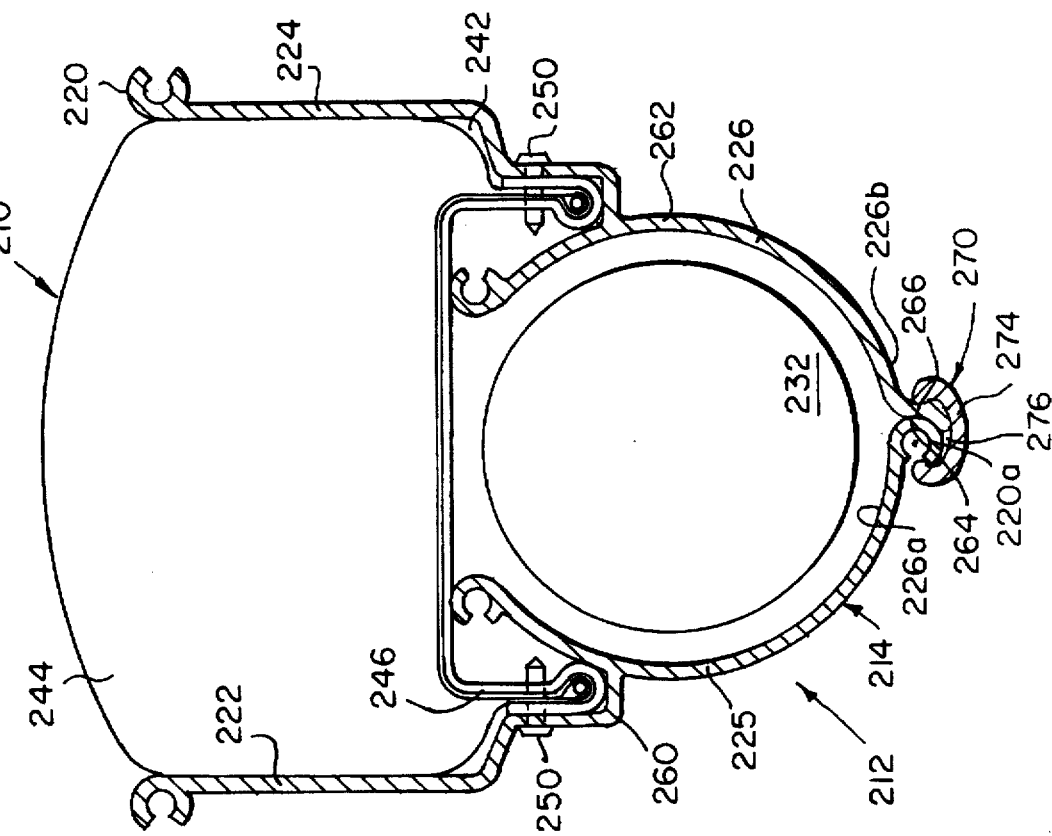

Referring to the drawings and initially referring to FIG. 2A, there is illustrated an airbag module assembly, generally designated by the reference numeral 210. The airbag module assembly 210 is generally similar to the airbag module assembly 10 shown in FIG. 1 and includes a reaction canister 212, an inflator 232, an airbag 244 and a diffuser device 246, with the reaction canister 212, the airbag 244, and the diffuser device 246 and secured together such as by means of fasteners 250.

As with the airbag module assembly 10 illustrated in FIG. 1, the reaction canister 212 of the assembly 210 include a reaction canister body 214 which includes first and second opposite side walls or panels, 222 and 224, respectively, joined together by means of a bridging portion 225 having the form of an integrally shaped inflator holder 226. The inflator holder 226 has an inner surface 226a and an outer surface 226b and is sized, shaped, and adapted for the placement therein of the inflatable restraint system inflator 232, such as an inflator having an elongated tubular chamber portion with opposite ends and from which gas is discharge from one of such ends. As described above, such an inflator holder has a generally circular cross section extending less than 360°.

Similarly the first and second opposite side walls 222 and 224 are spaced apart to define an airbag retaining cavity 242. The reaction canister body 214 also includes attachment preparations 220, such as to permit and facilitate end plate attachment (such end plates are not shown in FIG. 2A).

The assembly 210 differs from the assembly 10 described above, however, in that rather than a reaction canister body of a one piece construction, the reaction canister body 214 of the assembly 210 is, as described in greater detail below, a multiple piece construction wherein these pieces are secured together by one or more thermally degradable joining members.

Specifically, the reaction canister body 214 is formed by first and second portions, generally designated 260 and 262, respectively. Each of these reaction canister body portions 260 and 262 includes a mating surface, designated 264 and 266, respectively. In particular, the mating surface 264 includes a generally male form and the mating surface 266 includes a generally female form.

As shown, one or more of such mating surfaces can, if desired, include an attachment preparation 220a, such as in the form of a screw channel wherein an end plate screw fastener, such as described above (not here shown), can be appropriately inserted or placed.

In one preferred form, as shown in FIG. 2A, at least one of the mating surfaces 264 and 266 form a protrusion 270 at the outer surface 226b of the inflator holder 226. Upon exposure to an appropriately higher temperature outer environment, e.g., external or outside the canister assembly and such as may occur in a bonfire, the inclusion of such a reaction canister body protrusion beneficially can, either or both, increase the amount of reaction canister body surface area exposed to the higher temperature outer environment and the proximity of the joining member to the external higher temperature source.

Such reaction canister body portions can be fabricated by various manufacturing techniques including metal stamping and, preferably, extrusion, preferably extrusion of a lightweight metal such as aluminum or magnesium.

In the assembled reaction canister 212, the mating surfaces 264 and 266 are preferably in close or abutting relationship, with the so formed assembled reaction canister 212 generally able to provide desired structural support for at least selected assembly components such as one or more of the inflator 232 and the airbag 244. In accordance with the invention, such body portions 260 and 262 are normally maintained in such close or abutting arrangement by means of a joining member 274. The joining member 274 generally extends longitudinally along the length of the reaction canister 212. The joining member 274 has a generally C-shaped cross section and forms a channel 276 wherein the body portions 260 and 262, specifically the mating surfaces thereof, 264 and 266, respectively, are secured in such close or abutting arrangement.

Such a joining member is designed to degrade at a temperature greater than the ambient temperature to which the reaction canister is normally subjected and less than the temperature at which the inflator of the assembly autoignites. In practice, such a joining member will typically degrade at temperatures in the range of about 250° F. to about 350° F.

Such degradation of the joining member is illustrated in FIG. 2B with the assembly and components thereof being similarly numbered but with the addition of a prime, e.g., "'" to the reference numeral, e.g., the assembly 210'.

With the degradation of the joining member 274', the reaction canister body portions 260' and 262' separate to form an opening 280 wherethrough gas (signified by the arrows 282) issuing from the inflator 232', such as upon the autoignition thereof, can be comparatively safely exhausted in a specified, desired direction, e.g., in a direction away from the occupant compartment of the vehicle interior. It will be appreciated that in typical placement of such assemblies within vehicles, such gas exhaustion will typically be in a direction away from the occupant compartment of the vehicle interior.

It will be appreciated that such the joining member 274 can be formed from various appropriate thermally degradable materials including thermoplastics and metal alloys such as metal alloys of bismuth, lead, cadmium, and tin, for example, as such relatively low melting point alloys are well known.

While FIG. 2A illustrated an embodiment of the invention wherein the body portions 260 and 262 each have one mating surface held in abutting relationship by means of a thermally degradable joining member, FIG. 3A illustrates an airbag module assembly, designated 310, in accordance with an alternative embodiment of the invention.

The airbag module assembly 310 is generally similar to the airbag module assembly 10 shown in FIG. 1 and the airbag module assembly 210 shown in FIG. 2A. The airbag module assembly 310 includes a reaction canister 312, an inflator 332, an airbag 344, a diffuser device 346 and fasteners 350 by means of which the reaction canister 312, the airbag 344, and the diffuser device 346 and secured together.

As with the above-described airbag module assemblies, the reaction canister 312 includes a reaction canister body 314 which forms an inflator holder 326. The reaction canister 312 similarly also includes first and second opposite side walls 322 and 324 spaced apart to define an airbag retaining cavity 342. Further, the reaction canister body 314 similarly also includes attachment preparations 320, such as to permit and facilitate end plate attachment (such end plates are not shown in FIG. 3A).

The reaction canister 312 also includes first and second body portions, 360 and 362, respectively. While in the illustrated embodiment the first body portion 360 includes a first body part 386 and a second body part 388, it is to be appreciated that such first and second body parts can be joined or formed together as one part, if desired.

Each of the body portions 360 and 362 includes a first mating surface 364 and 366, respectively, and a second mating surface 390 and 392, respectively. Specifically, the first and second mating surfaces 364 and 390, respectively, of the body portion 360 are spaced apart to form a gap opening 394. The second reaction canister body portion 362 is adapted to span the gap opening 394 with:

a. the first mating surface 364 of the first reaction canister body portion 360 abutting against the first mating surface 366 of the second reaction canister body portion 362, with these first mating surfaces, 364 and 366, respectively, being held in abutting relationship by means of a first thermally degradable joining member 374, and b. the second mating surface 390 of the first reaction canister body portion 360 abutting against the second mating surface 392 of the second reaction canister body portion 362, with these second mating surfaces, 390 and 392, respectively, being held in abutting relationship by means of a second thermally degradable joining member 395, similar to the first thermally degradable joining member 374.

Again, such joining members are designed to degrade at a temperature greater than the ambient temperature to which the reaction canister is normally subjected and less than the temperature at which the inflator of the assembly autoignites.

Such degradation of the joining members is illustrated in FIG. 3B with the assembly and components thereof being similarly numbered but with the addition of a prime, e.g., "'", to the reference numeral, e.g., the assembly 310'.

With the degradation of the joining members 374' and 395', the reaction canister body portions 360' and 362' separate such as by the not fully supported body portion 362' falling away or vacating the gap opening 394' whereby exhaust gas (signified by the arrows 382) issuing from the inflator 332' such as upon the autoignition thereof, can be comparatively safely exhausted in a specified, desired direction. It will again be appreciated that in typical placement of such assemblies within vehicles, such gas exhaustion will typically be in a direction away from the occupant compartment of the vehicle interior.

While the invention has been described above relative to a joining member of one piece construction formed of a material such a thermoplastic or a metal which appropriately degrades at a temperature greater than the ambient temperature to which the reaction canister is normally subjected and less than the temperature at which the inflator autoignites the invention is not so limited. For example, a joining member of multiple piece construction can, if desired, be used.

Figure 5:
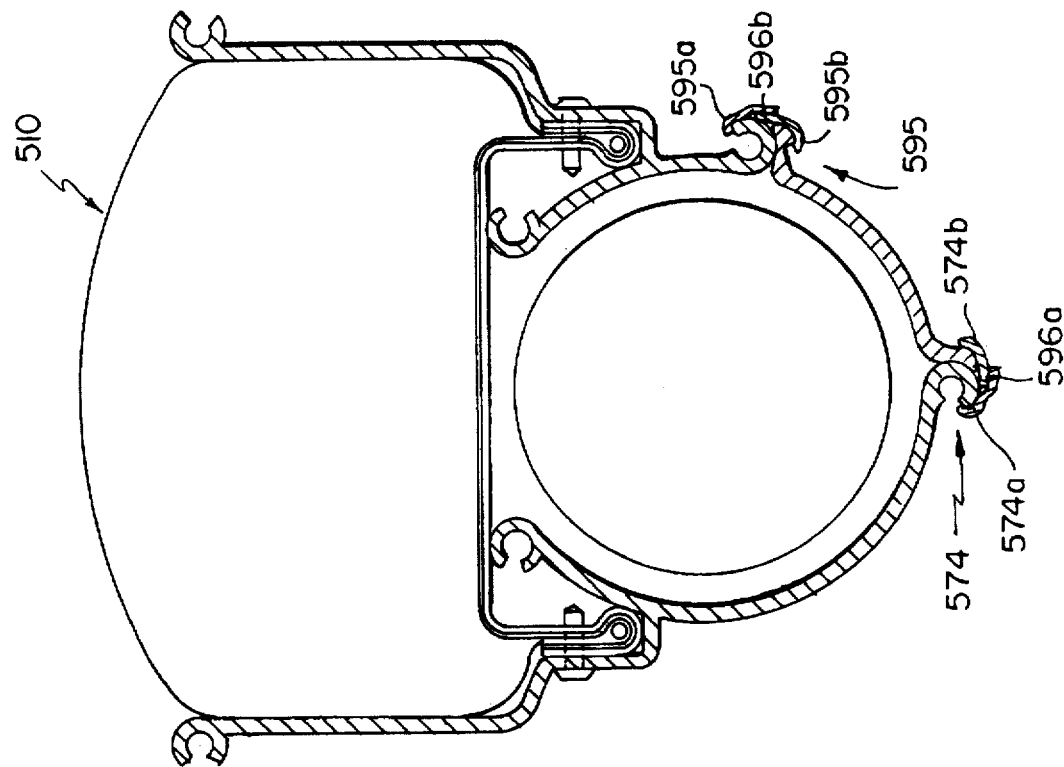
FIG. 5 is a simplified cross section view of an airbag module assembly in accordance with yet still another alternative embodiment of the invention.
Figure 4:
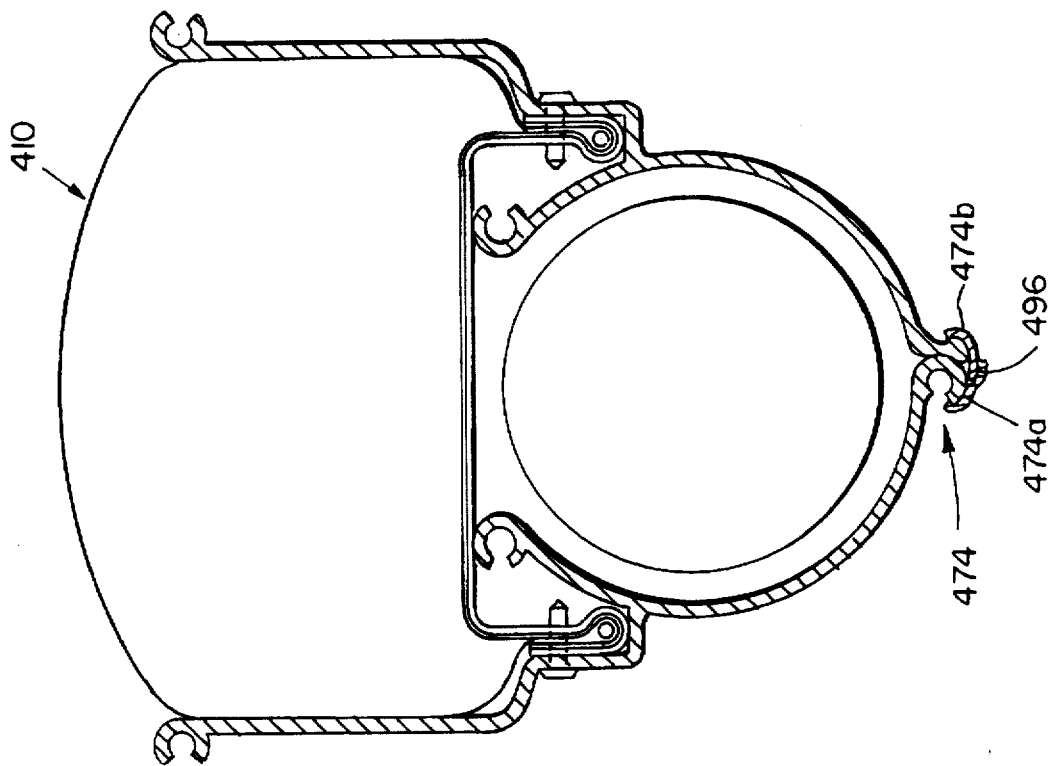
FIG. 4 is a simplified cross section view of an airbag module assembly in accordance with another alternative embodiment of the invention.

FIGS. 4 and 5 illustrate assembly embodiments, designated 410 and 510, respectively, generally similar to the above-described assemblies 210 and 310, respectively of FIGS. 2A and 3A. In assemblies 410 and 510, however, the assemblies include a multiple piece joining member rather than a joining member of a one piece construction of thermally degradable material. Specifically, the joining member 474 shown in FIG. 4 and the joining members 574 and 595 shown in FIG. 5 each includes a first piece, designated 474a, 574a, and 595a, respectively, and a second piece, designated 474b, 574b, and 595b, respectively, with the respective first and second pieces being secured together by means of a binding material, designated 496, 596a and 596b, respectively.

Such binding material is designed and selected to degrade at a temperature greater than the ambient temperature to which the reaction canister is normally subjected and less than the temperature at which the inflator autoignites. In practice, binding materials which degrade, e.g., melt, at temperatures in the range of about 250° F. to about 350° F., can typically be used. It will be appreciated that the thermally degradable binding material used to secure such first and second pieces together can be selected from various materials, e.g. solder, including metal alloys such as metal alloys of bismuth, lead, cadmium, and tin, for example, as such relatively low melting point alloys are well known.

It is to be understood that while the invention has been illustrated and described relative to a reaction canister housing both an inflator and an airbag, the invention is not so limited. For example, if desired, the invention can be utilized in assemblies wherein the airbag is not housed within the reaction canister, such as what is commonly called a "soft-pack" assembly.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. In an inflatable restraint system reaction canister which forms a housing for an airbag inflator, the improvement comprising:

first and second reaction canister body portions secured together by means of at least one thermally degradable joining member which degrades at a temperature greater than the ambient temperature to which the reaction canister is normally subjected and less than the temperature at which the inflator autoignites, to permit separation of said first and second reaction canister body portions.

2. The inflatable restraint system reaction canister of claim 1 wherein said at least one thermally degradable joining member is formed of a material which degrades at a temperature greater than the ambient temperature to which the reaction canister is normally subjected and less than the temperature at which the inflator autoignites.

3. The inflatable restraint system reaction canister of claim 2 wherein the degradable material is a thermoplastic.

4. The inflatable restraint system reaction canister of claim 2 wherein the degradable material is a metal.

5. The inflatable restraint system reaction canister of claim 1 wherein said at least one thermally degradable joining member comprises at least two pieces secured together by means of a material which degrades at a temperature greater than the ambient temperature to which the reaction canister is normally subjected and less than the temperature at which the inflator autoignites.

6. The inflatable restraint system reaction canister of claim 5 wherein the degradable material is a metal alloy of at least one of the following metals: bismuth, lead, cadmium, and tin.

7. The inflatable restraint system reaction canister of claim 1 wherein each of said first and second reaction canister body portions includes a first mating surface, with the first mating surface of said first reaction canister body portion abutting against the first mating surface of said second reaction canister body portion, with the first mating surfaces held in abutting relationship by means of a first thermally degradable joining member.

8. The inflatable restraint system reaction canister of claim 7 wherein the first mating surface of said first reaction canister body portion includes a male form and the first mating surface of said second reaction canister body portion includes a female form adapted for mating joinder with the male form mating surface of said first reaction canister body portion.

9. The inflatable restraint system reaction canister of claim 7 wherein each of said first and second reaction canister body portions additionally includes a second mating surface spaced apart from the first mating surface of said respective reaction canister body portion, with the first and second mating surfaces of said first reaction canister body portion spaced apart to form a gap opening, said second reaction canister body portion adapted to span the gap opening with the second mating surface of said first reaction canister body portion abutting against the second mating surface of said second reaction canister body portion, with the second mating surfaces held in abutting relationship by means of a second thermally degradable joining member.

10. The inflatable restraint system reaction canister of claim 7 forming a wall with opposite inner and outer surfaces with the inner surface adjacent the inflator, wherein at least one of the first mating surfaces forms a protrusion on the outer surface of the wall.

11. The inflatable restraint system reaction canister of claim 7 wherein at least one of the first mating surfaces comprises an attachment preparation.

12. The inflatable restraint system reaction canister of claim 1 wherein each of said first and second reaction canister body portions are formed by conventional extrusion fabrication.

13. The inflatable restraint system reaction canister of claim 12 wherein each of said first and second reaction canister body portions is formed of extruded metal.

14. The inflatable restraint system reaction canister of claim 13 wherein said extruded metal comprises aluminum.

15. The inflatable restraint system reaction canister of claim 1 wherein at least one of said first and second reaction canister body portions comprises aluminum.

16. In an airbag module subassembly comprising:

an inflatable restraint system reaction canister which includes a trough shaped body section having first and second opposite side walls spaced apart to form an air bag retaining cavity and a bridging portion joining said first and second opposite side walls forming an inflator holder having a generally circular cross section extending less than 360°; and an elongated inflator having an inflator chamber tube within the inflator holder;

the improvement comprising:

the trough shaped body section including first and second conventionally extruded reaction canister body portions, each of said first and second reaction canister body portions includes a first mating surface, the first mating surface of said first reaction canister body portion having a male form and the first mating surface of said second reaction canister body portion having a female form adapted for mating joinder with the male form mating surface of said first reaction canister body portion, with the first mating surfaces held in abutting relationship by means of a thermally degradable joining member.

17. The airbag module subassembly of claim 16 wherein said thermally degradable joining member comprises a material which degrades at a temperature greater than the ambient temperature to which the reaction canister is normally subjected and less than the temperature at which the inflator autoignites.

18. The airbag module subassembly of claim 17 wherein the degradable material is a thermoplastic.

19. The airbag module subassembly of claim 17 wherein the degradable material is a metal.

20. The airbag module subassembly of claim 17 wherein said thermally degradable joining member comprises at least two pieces secured together by means of a material which degrades at a temperature greater than the ambient temperature to which the reaction canister is normally subjected and less than the temperature at which the inflator autoignites.

21. The airbag module subassembly of claim 17 wherein the degradable material is a metal alloy of at least one of the following metals: bismuth, lead, cadmium, and tin.

* * * * *